(12) United States Patent
Franchet et al.

(10) Patent No.: US 10,837,069 B2
(45) Date of Patent: Nov. 17, 2020

(54) DEVICE FOR GENERATING A MICROSTRUCTURE WITH A STRUCTURAL GRADIENT IN AN AXISYMMETRIC PART

(71) Applicant: SAFRAN, Paris (FR)

(72) Inventors: Jean-Michel Patrick Maurice Franchet, Paris (FR); Gilles Charles Casimir Klein, Mery sur Oise (FR)

(73) Assignee: SAFRAN, Paris (FR)

( * ) Notice: Subject to any disclaimer, the term of this patent is extended or adjusted under 35 U.S.C. 154(b) by 305 days.

(21) Appl. No.: 15/773,917

(22) PCT Filed: Nov. 4, 2016

(86) PCT No.: PCT/FR2016/052859
§ 371 (c)(1),
(2) Date: May 4, 2018

(87) PCT Pub. No.: WO2017/077248
PCT Pub. Date: May 11, 2017

(65) Prior Publication Data
US 2018/0371563 A1 Dec. 27, 2018

(30) Foreign Application Priority Data
Nov. 6, 2015 (FR) ...................................... 15 60653

(51) Int. Cl.
*C21D 1/42* (2006.01)
*C22F 1/00* (2006.01)
*C21D 1/00* (2006.01)

(52) U.S. Cl.
CPC ................. *C21D 1/42* (2013.01); *C21D 1/00* (2013.01); *C22F 1/00* (2013.01); *C21D 2221/10* (2013.01)

(58) Field of Classification Search
CPC ............................. C21D 1/42; C21D 2221/10
(Continued)

(56) References Cited

U.S. PATENT DOCUMENTS 2,556,236 A * 6/1951 Strickland, Jr. .......... C21D 1/10
148/570
2,556,243 A * 6/1951 Vaughan ................... C21D 1/10
148/570

(Continued)

FOREIGN PATENT DOCUMENTS

RU 2119842 C1 10/1998
RU 2548349 C2 4/2015

OTHER PUBLICATIONS

International Search Report as issued in International Patent Application No. PCT/FR2016/052859, dated Feb. 2, 2017.
(Continued)

*Primary Examiner* — Scott R Kastler
(74) *Attorney, Agent, or Firm* — Pillsbury Winthrop Shaw Pittman LLP

(57) ABSTRACT

A device for generating a microstructure with a structure gradient in an axisymmetric mechanical part having a hollow center and initially possessing a uniform structure with fine grains, the device including a first heater system defining a first shell for receiving the mechanical part and suitable for heating the outer periphery of the mechanical part to a first temperature higher than the solvus temperature. The device further includes a second heater system defining a second shell arranged inside the first shell and suitable for heating the inner periphery of the mechanical part to a second temperature lower than the solvus temperature, with the space between the first shell and the second shell defining a housing suitable for receiving the axisymmetric mechanical part having a hollow center.

11 Claims, 2 Drawing Sheets

(58) Field of Classification Search
USPC .......................................................... 266/123
See application file for complete search history.

(56) References Cited

U.S. PATENT DOCUMENTS

| | | | |
|---|---|---|---|
| 3,741,821 | A | 6/1973 | Athey et al. |
| 4,785,147 | A | 11/1988 | Mucha et al. |
| 5,312,497 | A | 5/1994 | Mathey |
| 5,527,020 | A | 6/1996 | Ganesh et al. |
| 6,145,194 | A | 11/2000 | Munson et al. |
| 6,660,110 | B1 | 12/2003 | Gayda et al. |
| 6,939,419 | B1 | 9/2005 | Utyashev et al. |
| 6,974,508 | B1 | 12/2005 | Gabb et al. |
| 8,496,872 | B1 | 7/2013 | Weires et al. |
| 2010/0252151 | A1 | 10/2010 | Furrer et al. |

OTHER PUBLICATIONS

Gayda, J., et al., "The Effect of Dual Microstructure Heat Treatment on an Advanced Nickel-Base Disk Alloy," Superalloys 2004—10$^{th}$ International Symposium on Superalloys, Sep. 2004, XP055269844, ISBN: 978-0-87339-576-2, pp. 323-329.

* cited by examiner

DEVICE FOR GENERATING A MICROSTRUCTURE WITH A STRUCTURAL GRADIENT IN AN AXISYMMETRIC PART

CROSS-REFERENCE TO RELATED APPLICATIONS

This application is the U.S. National Stage of PCT/FR2016/052859, filed Nov. 4, 2016, which in turn claims priority to French patent application number 1560653, filed Nov. 6, 2015. The content of these applications are incorporated herein by reference in their entireties.

BACKGROUND OF THE INVENTION

The invention relates to generating a microstructure with a structural gradient in a mechanical part, and more particularly in axisymmetric parts that are hollow in the center.

Environmental standards, such as the ACARE 2020 standard, and also requirements for reducing the cost of possession, i.e. operating and maintenance costs, as imposed by aircraft manufacturers, require engine manufacturers to develop turbojets with ever-improved performance, and in particular with a great decrease in specific fuel consumption.

This search for a reduction in consumption leads to a need to improve the efficiency of an engine by reducing ventilation of hot parts and in particular of disks. A direct consequence of a reduction in ventilation is a need for materials with better high-temperature capability.

A large amount of progress has been achieved in the field of materials for increasing high-temperature capability: more-refractory materials, powder metallurgy technology, etc.

Nevertheless, the temperature improvements are very limited and the chemical composition of the material cannot on its own satisfy the targets set.

One way of pushing back the limits of materials is to adapt the microstructure of a part to the local mechanical stresses to which the part is subjected. Specifically, in a part, mechanical stresses may differ depending on the zone under consideration. Consequently, the optimum microstructure may vary within a part as a function of the zone under consideration. In other words, it is desired to have a single part with two microstructures or with a microstructure having a gradient.

For example, for a turbine disk, which is one of the parts in a turbojet that is subjected to the greatest temperature and mechanical stresses, the performance of a material lies in its ability, with an optimized uniform microstructure, to achieve the best compromise between the various different required mechanical properties, which are often contradictory.

The use of two microstructures or of a microstructure gradient for making a turbine disk would make it possible to avoid that compromise. It would be necessary to have a fine-grain structure in the bore of the disk because of its traction and fatigue characteristics at medium temperature, and a coarse-grain structure in the rim of the same disk in order to have better properties concerning high-temperature creep and cracking.

The term "fine-grain" structure is used to mean a structure in which the grains are blocked by the γ' or δ phase, while the term "coarse-grain" structure is used to mean a structure in which the grains are not blocked by those phases.

In general, the size of grains in a structure is given in compliance with the ASTM standard where 1 ASTM corresponds to a grain size of 225 micrometers (μm), i.e. a coarse grain, and 10 ASTM corresponds to a grain size of 10 μm, i.e. a fine grain.

In general, for any type of alloy, it is considered that the size of a grain corresponds to a "fine" grain size if its size is greater than 9 ASTM.

Depending on the type of alloy, the size of grains from which it can be considered that grains are coarse can vary. In general, grain size should be smaller than 7 ASTM. This applies in particular to alloys prepared by powder metallurgy (N18, N19). For conventional alloys of the AD730, R65, and U720 types, a grain is considered as being coarse if its size is less than 4 ASTM, and for Inco718, depending on the temperature reached, a grain is considered as being coarse if its size lies in the range 3 ASTM to 6 ASTM.

One means known for achieving structure gradients in a part of disk type is to perform heat treatment, itself presenting a gradient.

The purpose of such heat treatment with a temperature gradient is to perform solution treatment at staged temperatures within the part such that:
  in the highest temperature zone, the temperature is higher than the dissolution temperature of the phase blocking the grain boundaries, also referred to as the solvus temperature; and
  in the lowest temperature zone, the temperature is below that solvus temperature.

Grain boundaries correspond to the interfaces between crystals of the same kind within a polycrystalline structure. For nickel-based alloys, the phases in question are the γ' or δ phases. Thus, in zones where the temperature during heat treatment exceeds the solvus temperature of γ' or δ phases, the grains grow so as to form a structure that is favorable for creep and cracking properties, whereas in zones where the temperature remains below the solvus temperature during the heat treatment, the structure conserves its grain size that results from forging, which is generally relatively fine and favorable to traction and fatigue properties.

In order to perform that type of heat treatment, two types of heat treatment strategy are known.

In a first strategy, the entire disk is placed in an oven and taken to a temperature that is high enough to cause grains to grow. The zones in which it is desired to conserve a fine-grain structure, i.e. the zones that are to be maintained at a temperature below the solvus temperature, are cooled by local cooling systems using air, as described in Documents U.S. Pat. Nos. 5,527,020 and 5,312,497, or by insulation, as described in Document U.S. Pat. No. 6,660,110. Those systems present the drawback of being difficult to set up and inflexible as a function of the shape of the part.

More particularly, in Document U.S. Pat. No. 5,312,497, the outside portion of the disk is heated by a graphite susceptor which is itself heated by a water-cooled induction coil, and the inside portion of the disk is cooled by a compressed air cooling coil. That system presents the additional drawback of needing to operate in a vacuum in order to ensure the carbon susceptor does not burn.

A second strategy consists in applying heating locally by induction in the peripheral zone of the part. As described in Documents U.S. Pat. Nos. 4,785,147 and 3,741,821, that strategy is conventionally used for locally reinforcing gear teeth by heat treatment. When applied to a turbojet disk, that amounts to locally heating the outside of the part by induction. A high frequency current is applied to an induction coil surrounding the part so that a high frequency electromagnetic field becomes coupled with the part in order to heat it.

A temperature gradient is then set up in the part between the outside heated by induction and the center in open air.

That technique is clearly better adapted for generating temperature gradients in a turbojet disk and thus for generating different structures between the rim and the bore of the disk.

Nevertheless, in that strategy with a peripheral induction coil, gradient management is difficult and can be subjected to very little control. Furthermore, because of the large temperature gradient, that strategy generates high levels of thermomechanical stress within the disk, which may be great enough to break the material.

Furthermore, that technique of local heating by induction leads to very fast cooling at the surface when the heating is stopped. Unfortunately, with certain alloys that are sensitive to quench cracking, that can lead to cracking of the material.

Furthermore, another major difficulty in generating a microstructure with a structure gradient lies in managing temperatures and in particular the maximum temperature that needs to be high enough to lead to grain growth in the microstructure but not too high in order to avoid having grains of too great a size and even to avoid reaching the burning temperature of the material, which would then lead to irreversible degradation of the material.

Materials for which the difference between the solvus temperature and the burning temperature is small are consequently difficult to treat using the above-mentioned known techniques.

OBJECT AND SUMMARY OF THE INVENTION

The invention seeks to mitigate the above-mentioned drawbacks by proposing a device for generating a microstructure with a structural gradient in an axisymmetric mechanical part having a hollow center, which method makes it possible to adjust the temperatures in the zones of the mechanical part for treatment while reducing thermomechanical stresses.

To this end, there is provided a device for generating a microstructure with a structure gradient in an axisymmetric mechanical part having a hollow center and initially possessing a uniform structure with fine grains, the device comprising first heater means defining a first shell for receiving the mechanical part and suitable for heating the outer periphery of the mechanical part to a first temperature higher than the solvus temperature.

According to a general characteristic of the invention, the device comprises second heater means defining a second shell arranged inside the first shell and suitable for heating the inner periphery of said mechanical part to a second temperature lower than the solvus temperature, with the space between the first shell and the second shell defining a housing suitable for receiving the axisymmetric mechanical part having a hollow center.

The presence of second heater means mounted facing the inner periphery of the annular part for treatment makes it possible in co-operation with the first heater means mounted at the outer periphery of the mechanical part for treatment to heat simultaneously both the outside and the inside of the disk by using two distinct heater means. This simultaneous heating from two ends of a mechanical part, specifically two circular ends for a part that is annular, makes it possible to control heat flux by using the heat energy supplied from the inside by the second heater means.

This configuration with two heater means can even make it possible to reverse the heat flux, should that be necessary.

This scheme is particularly suitable for turbojet disks, which have a hollow bore for passing the central shaft of the engine and which can be placed in the housing provided between the two heater devices.

The device makes it possible throughout the treatment, and above all while maintaining said temperature, to guarantee a regulated temperature difference between zones of the disk. It enables temperatures to be adjusted in the various zones of the part and above all to set up an equilibrium state while temperature is being maintained. It also makes it possible to control the position of the transition zone between the coarse-grain structure and the fine-grain structure. Such control is performed mainly as a function of the temperature setpoints given to the two heater means and as a function of the shape of the mechanical part being treated.

For example, the first heater means arranged at the outside of the mechanical part for treatment may serve to heat the outside of the disk locally to a temperature that is high enough for grains to grow, i.e. a temperature that is higher than the solvus temperature, and the second heater means arranged at the inside can serve to heat the inside of the disk locally to a temperature that is lower than the temperature for grain growth in the material. Regulating the two heater means makes it possible to set up a temperature gradient within the part that leads to a microstructure gradient.

Furthermore, unlike the principles described in the second strategy used in particular in above-mentioned Documents U.S. Pat. Nos. 4,785,147 and 3,741,821, the above-defined device of the invention with two heater means makes it possible to limit thermomechanical stresses, as from the beginning of treatment, by adjusting the temperature difference between the bore and the rim.

This has the effect of eliminating any risk of cracks appearing. This applies likewise to the cooling stage. Specifically, it is possible to provide better control over the cooling of the outside surface by maintaining an active state for the second heater means arranged inside the mechanical part for treatment, so as to control the temperature gradient also during cooling, thereby avoiding quench cracking.

A first example of parts for treatment may correspond to turbine disks having an outside diameter of about 500 millimeters (mm) and an inside diameter of about 100 mm to 150 mm, made of a nickel-based alloy prepared in conventional manner, of Inco718 or AD730 or Rene65 type, or prepared by powder metallurgy, of N18 or N19 type.

A second example of a part for treatment may correspond to labyrinth rings having an outside diameter of 800 mm and an inside diameter of about 650 mm and made of a nickel-based alloy of Inco718 type or of Waspaloy, AD730, or Rene65 type.

In a first aspect of the device for generating a microstructure with a structure gradient, the device comprises a control unit configured to deliver a first temperature setpoint to the first heater means and a second temperature setpoint to the second heater means, the control unit including a synchronization module suitable for coordinating the delivery of the first and second temperature setpoints so that the first heater means and the second heater means operate simultaneously during a stage of heating and/or a stage of cooling in the generation of a microstructure with a structure gradient.

Simultaneously controlling the heater means makes it possible continuously to control the thermomechanical stresses imposed on the mechanical part for treatment, and in particular to avoid any excessive temperature being applied to a zone of the part for treatment.

In a second aspect of the device for generating a microstructure with a structure gradient, the control unit includes a regulator module for regulating the heating temperature difference between the first heater means and the second heater means so as to determine the value of the first temperature setpoint and the value of the second temperature setpoint as a function of the position desired for an intermediate zone between a fine-grain structure and a coarse-grain structure in the mechanical part.

The device can thus be controlled not by defining temperature setpoints, but merely by defining a precise location for an intermediate zone between the coarse-grain zone and the fine-grain zone, with the control unit including a map that enables it, on the basis of this setpoint for locating the intermediate zone, to determine the temperature setpoints for delivering to the first and second heater means.

In a third aspect of the device for generating a microstructure with a structure gradient, the first and second heater means respectively comprise first and second distinct induction coils.

The use of first and second induction coils as first and second heater means makes it possible for the device to operate in open air, unlike the main devices in the prior art.

In addition, using induction coils as heater means enables control to be simplified on the basis of the power supplies, with the temperature setpoints determined by the control unit being transformed by the control unit into power supply setpoints for the induction coils, prior to those setpoints being sent to the first and second induction coils.

In a fourth aspect of the device for generating a microstructure with a structure gradient, the control unit includes a module for regulating the frequency of the electricity respectively powering the first induction coil and the second induction coil.

Regulating the frequency of the power supplies to the first and second induction coils serves to control the transition zone within the mechanical part.

In this kind of application, the induction frequencies used lie in the range 5 kilohertz (kHz) to 30 kHz in order to be in an inductive looping situation with large skin thickness. A "large skin thickness" for inductive looping means inductive looping penetrating into the core of the part for heating in order to perform melting or heating within its volume. In this sense, inductive looping with small skin thickness would correspond to inductive looping directed towards the surface of the part, and is recommended for embossing, levitating, forming, while heating.

This frequency range has the effect of heating the part in preferred manner in depth rather than at the surface.

Adaptive frequency equilibrium is established so as to operate in the range 5 kHz to 30 kHz, however the particular frequency is the result of the matching unit of the induction coil, relating to its diameter and its number of turns, in combination with the shape of the part. Two parts of different shapes placed in a given assembly made up of a matching unit and the induction coil will provide different frequency balances, but lying within the range 5 kHz to 30 kHz.

The invention also provides a method of generating a microstructure with a structure gradient in an axisymmetric mechanical part having a hollow center, the method comprising subjecting a mechanical part initially possessing a uniform structure with fine grains to heat treatment, the heat treatment comprising a first heating operation of heating the outer periphery of the mechanical part to a first temperature higher than the solvus temperature.

According to a general characteristic of the invention, the heat treatment further comprises a second heating operation of heating the inner periphery of the mechanical part to a second temperature lower than the solvus temperature.

In a first aspect of the method of generating a microstructure with a structure gradient, the method comprises delivering a first temperature setpoint for heating the outer periphery of the mechanical part and delivering a second temperature setpoint for heating the inner periphery of the mechanical part, said delivery of the first and second setpoints being synchronized so that the first and second heating operations take place simultaneously during a stage of heating and/or a stage of cooling in the generation of microstructure with a structure gradient.

In a second aspect of the method of generating a microstructure with a structure gradient, the method includes regulating the temperature difference between the first and second heating operations, the values of the first and second temperature setpoints being determined as a function of the position desired for the intermediate zone between the coarse-grain structure and the fine-grain structure within the part.

In a third aspect of the method of generating a microstructure with a structure gradient, the first and second heating operations are respectively performed by independently powering distinct first and second induction coils.

In a fourth aspect of the method of generating a microstructure with a structure gradient, the method includes regulating the respective frequencies at which the first and second induction coils are powered.

The invention also provides a turbine disk including at least a portion of microstructure with a structure gradient generated by the above-defined method.

The invention also provides a turbine engine including at least one turbine disk as defined above.

The invention also provides an aircraft including at least one turbine engine as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 1:
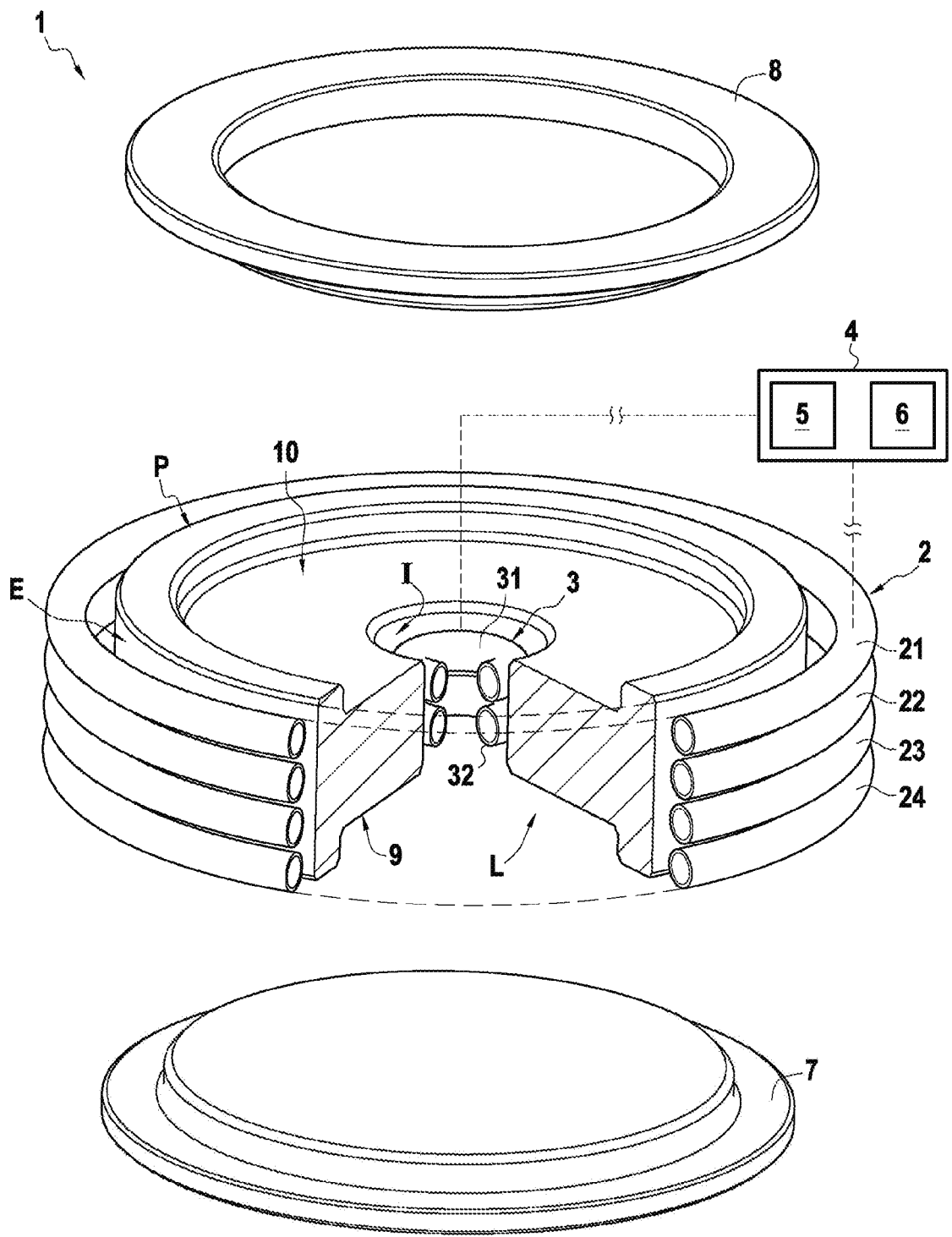
FIG. 1 is a perspective view of a device of the invention for generating a microstructure with a structure gradient.
Figure 2:
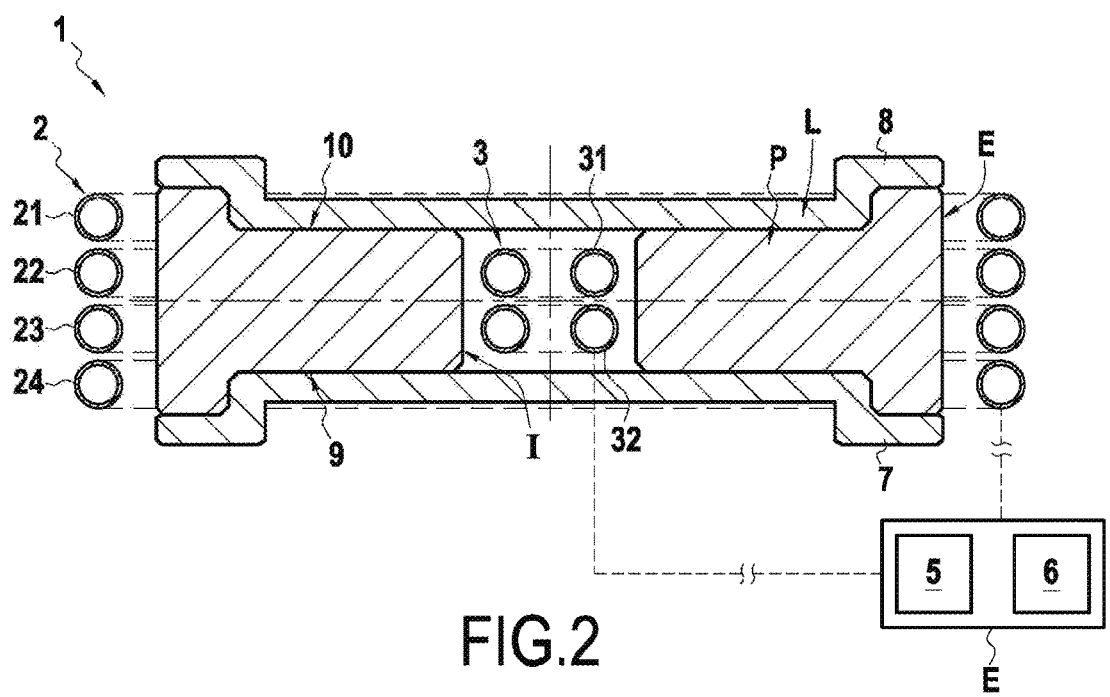
FIG. 2 is a diagrammatic section view of the FIG. 1 device.

FIGS. 1 and 2 are respectively a perspective view and a section view of a device of the invention for generating a microstructure with a structure gradient.

Both figures show an annular mechanical part P, e.g. a turbine disk, placed in a device 1 for generating a microstructure with a structure gradient. Prior to any heat treatment by the device 1, the mechanical part P possesses a structure that is uniform with fine grains.

The device 1 has a first heater induction coil 2 and a second heater induction coil 3. For better visual understanding, the mechanical part P and the first and second heater induction coils 2 and 3 are shown in part only in FIG. 1.

In the embodiment shown in FIGS. 1 and 2, the first heater induction coil 2 has four turns 21, 22, 23, and 24 of radius greater than the outside radius of the annular mechanical part P. The first heater induction coil 2 is configured to heat the outer periphery E of the mechanical part P to a first temperature $T_1$ that is higher than the solvus temperature, i.e. higher than the dissolution temperature of the phase blocking the grain boundaries.

The second heater induction coil 3 is made up of two turns 31 and 32 of the radius smaller than the inside radius of the annular mechanical part P. The second heater induction coil 3 is configured to heat the inside periphery I of said mechanical part P to a second temperature $T_2$ lower than the solvus temperature.

Throughout the specification, the terms "inner", and "outer" are used relative to the axis of symmetry X of the mechanical part P and of the turns 21 to 24 and 31 and 32 of the first and second induction coils 2 and 3.

The first heater induction coil 2 forms a first closed shell within which there is arranged a second closed shell that is formed by the second heater induction coil 3. The two shells formed by the two heater induction coils 2 and 3 thus define an annular housing L that extends between the two shells. The housing L is shaped to receive the annular mechanical part P.

By using heater induction coils, the device 1 can operate in air and does not need to be placed in an evacuated structure in which the mechanical part P needs to be placed.

The device 1 also has a control unit 4 to which the first heater induction coil 2 and the second heater induction coil 3 are electrically connected. The control unit 4 has input means (not shown) enabling two distinct temperature setpoints to be input, as appropriate, for the two heater induction coils 3 and 4, or indeed for inputting the location of an intermediate zone. The location of the intermediate zone serves to define the position of the transition zone between fine grains and coarse grains within the mechanical part P after treatment by the device 1.

The control unit 4 is configured to respond to the information input using the input means so as to deliver a first temperature setpoint for the first heater induction coil 2 and a second temperature setpoint for the second heater induction coil 3.

Figure 3:
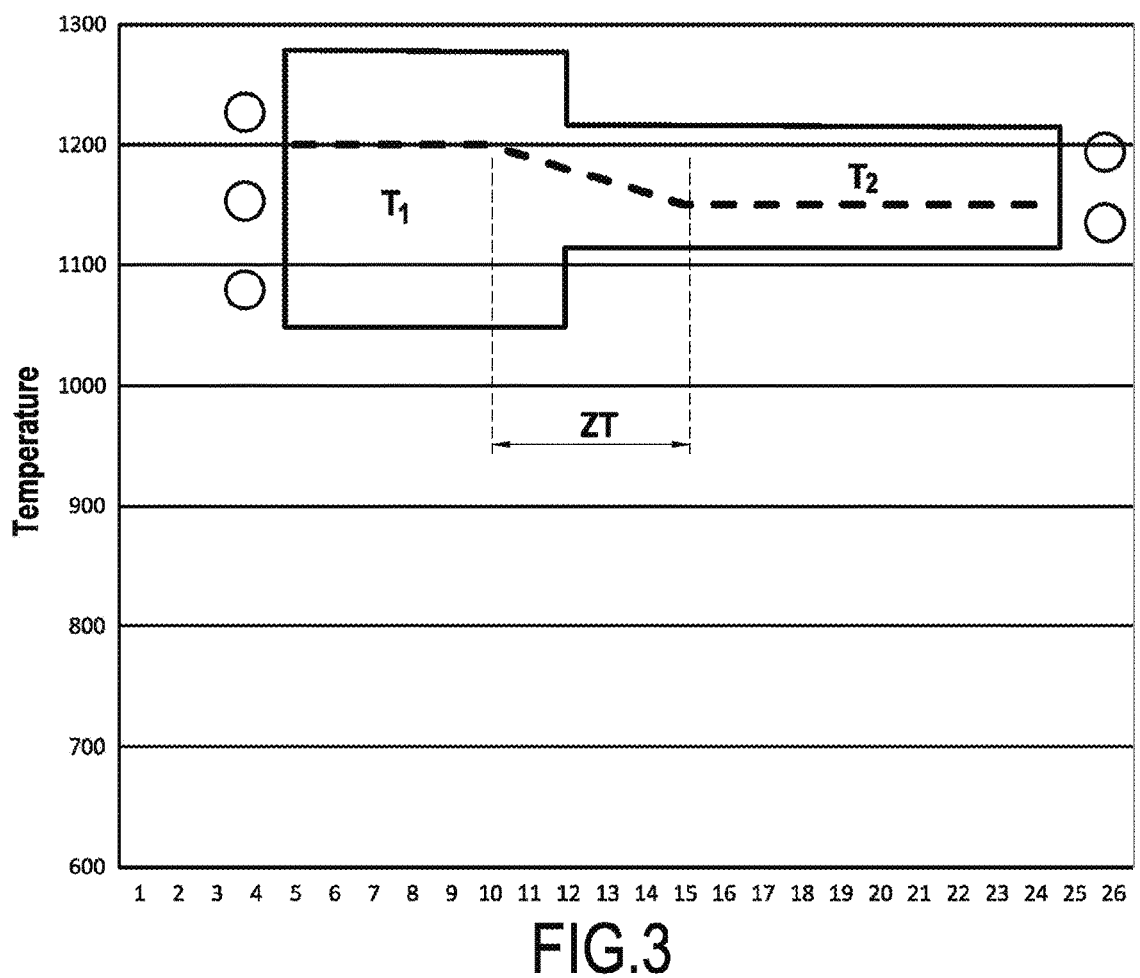
FIG. 3 is a graphical representation of the temperature distribution within a mechanical part placed in the FIG. 1 device.

As shown in FIG. 3, which is a graphical representation of the temperature distribution within the mechanical part P, the first temperature setpoint and the second temperature setpoint are selected in such a manner that the outer portion E of the mechanical part is at the temperature $T_1$, e.g., for a mechanical part P made of a nickel-based alloy, a temperature of about 1040° C. to 1060° for an Inco718 type alloy, or about 1120° C. to 1140° C. for an AD730 or a Rene65 type alloy, or about 1160° C. to 1180° C. for an N19 alloy made by powder metallurgy, and in such a manner that the inner portion I of the mechanical part P is at the second temperature $T_2$, e.g., for a mechanical part P made of a nickel-based alloy, a temperature of about 980° C. to 1100° C. for an Inco718 alloy, or about 1060° C. to 1080° C. for an AD730 or Rene65 type alloy, or about 1110° C. to 1130° C. for an N19 type alloy made by powder metallurgy. The intermediate zone ZT between the fine grain zone and the coarse grain zone may be of a length lying in the range 5 mm to 50 mm.

The control unit 4 has a regulator module 5 for regulating the heating temperature difference between the first heater induction coil and the second heater induction coil, which module is configured to determine the value for the first temperature setpoint and for the second temperature setpoint as a function of the position desired in the mechanical part for an intermediate zone between a coarse-grain structure and a fine-grain structure.

The control unit 4 also has a synchronization module 6 configured to coordinate the delivery of the first and second temperature setpoints as determined by the control unit 4 so that the first heater induction coil 2 and the second heater induction coil 3 operate simultaneously during a stage of heating and/or a stage of cooling when generating a microstructure with a structure gradient.

Coordinating the two heater induction coils 2 and 3 with the synchronization means 6 of the control unit 4 makes it possible to heat simultaneously both the outside and the inside of the disk while at all times controlling the temperatures to which the various zones of the mechanical part P are heated. Furthermore, by heating the part from both the outside and the inside, the temperatures applied to the mechanical part P by the two induction coils 2 and 3 can remain below the maximum temperatures that can be accepted by the mechanical part P, thereby avoiding any risk of the part P burning, since the inner zone of the mechanical part also receives heat energy from the second heater induction coil 3.

Thus, throughout the treatment, and above all while maintaining temperature, the heater inductor coils 2 and 3 maintain a regulated temperature difference between the zones of the mechanical part P.

Specifically, during the cooling stage, the control unit 4 controls the drop in temperature by adjusting the temperature setpoints that are applied to the first and second induction coils 2 and 3 so as to constantly maintain the same temperature difference.

The treatment method using the device 1 may occupy a duration in the range 15 minutes (min) to 2 hours (h).

In addition, in the embodiment shown in FIGS. 1 and 2, the device 1 has two pieces of insulation 7 and 8, each placed against a respective bottom face 9 or top face 10 of the annular mechanical part P. The first piece of insulation 7 is placed on the bottom face 9 of the mechanical part P so as to cover the entire bottom surface 9 of the mechanical part P extending from the outer periphery E to the inner periphery I and the second induction coil 3. Conversely, the second piece of insulation 8 is placed on the top face 10 of the mechanical part P so as to cover the entire top surface 10 of the mechanical part P extending from the inner periphery I to the outer periphery E and the second induction coil 3.

These pieces of insulation are particularly useful for mechanical parts P of very large dimensions for which the distance between the first and second induction coils 2 and 3 is very great, to such an extent that heat losses along the part can degrade the effectiveness of the heating by the two induction coils 2 and 3.

The invention thus provides a device for generating microstructure with a structure gradient in an axisymmetric mechanical part with a hollow center that enables temperatures to be adjusted in the zones of the mechanical part for treatment while also reducing the thermomechanical stresses to which the part is subjected.

The invention claimed is:

1. A device for generating a microstructure with a structure gradient in an axisymmetric mechanical part having a hollow center and initially possessing a uniform structure with fine grains, the device being configured to receive said mechanical part and the device comprising a first heater system defining a first shell for receiving the mechanical part, the first heater system being adapted to heat an outer periphery of the mechanical part to a first temperature higher than the solvus temperature, and a second heater system defining a second shell arranged inside the first shell, the second heater system being adapted to heat the inner periphery of said mechanical part to a second temperature lower than the solvus temperature, the space between the first shell and the second shell defining a housing suitable for receiving the axisymmetric mechanical part having a hollow center, and the device comprising two pieces of heat insulation, each of the two pieces of heat insulation being placed against a respective bottom face and top face of the mechanical part.

2. A device according to claim 1, including a control unit configured to deliver a first temperature setpoint to the first heater system and a second temperature setpoint to the second heater system, the control unit including a synchronization module suitable for coordinating the delivery of the first and second temperature setpoints so that the first heater system and the second heater system operate simultaneously during a stage of heating and/or a stage of cooling in the generation of a microstructure with a structure gradient.

3. A device according to claim 2, wherein the control unit includes a regulator module for regulating the heating temperature difference between the first heater system and the second heater system so as to determine the value of the first temperature setpoint and the value of the second temperature setpoint as a function of the position desired for an intermediate zone between a fine-grain structure and a coarse-grain structure in the mechanical part.

4. A device according to claim 3, wherein the first and second heater systems respectively comprise first and second distinct induction coils.

5. A device according to claim 4, wherein the control unit includes a module for regulating the frequency of the electricity respectively powering the first induction coil and the second induction coil.

6. A method of generating a microstructure with a structure gradient in an axisymmetric mechanical part having a hollow center using the device according to claim 1, the method comprising subjecting a mechanical part initially possessing a uniform structure with fine grains to heat treatment, the heat treatment comprising a first heating operation of heating an outer periphery of the mechanical part to a first temperature higher than the solvus temperature, wherein the heat treatment further comprises a second heating operation of heating an inner periphery of the mechanical part to a second temperature lower than the solvus temperature.

7. A method according to claim 6, comprising delivering a first temperature setpoint for heating the outer periphery of the mechanical part and delivering a second temperature setpoint for heating the inner periphery of the mechanical part, said delivery of the first and second setpoints being synchronized so that the first and second heating operations take place simultaneously during a stage of heating and/or a stage of cooling in the generation of microstructure with a structure gradient.

8. A method according to claim 6, including regulating the temperature difference between the first and second heating operations, the values of the first and second temperature setpoints being determined as a function of a position desired for the intermediate zone between a coarse-grain structure and a fine-grain structure within the part.

9. A method according to claim 6, wherein the first and second heating operations are respectively performed by independently powering distinct first and second induction coils.

10. A method according to claim 9, including regulating the respective frequencies at which the first and second induction coils are powered.

11. A device according to claim 1, wherein the first heater system is adapted to heat the entire outer periphery of the mechanical part to the first temperature, and the second heater system is adapted to heat the entire inner periphery of the mechanical part to the second temperature.

* * * * *